June 26, 1945.  C. P. FELDHAUSEN  2,379,072
CONTROLLER FOR MULTIMOTOR DRIVES
Filed April 24, 1942   3 Sheets-Sheet 1

Inventor
Cyril P. Feldhausen
By Frank H. Hubbard
Attorney

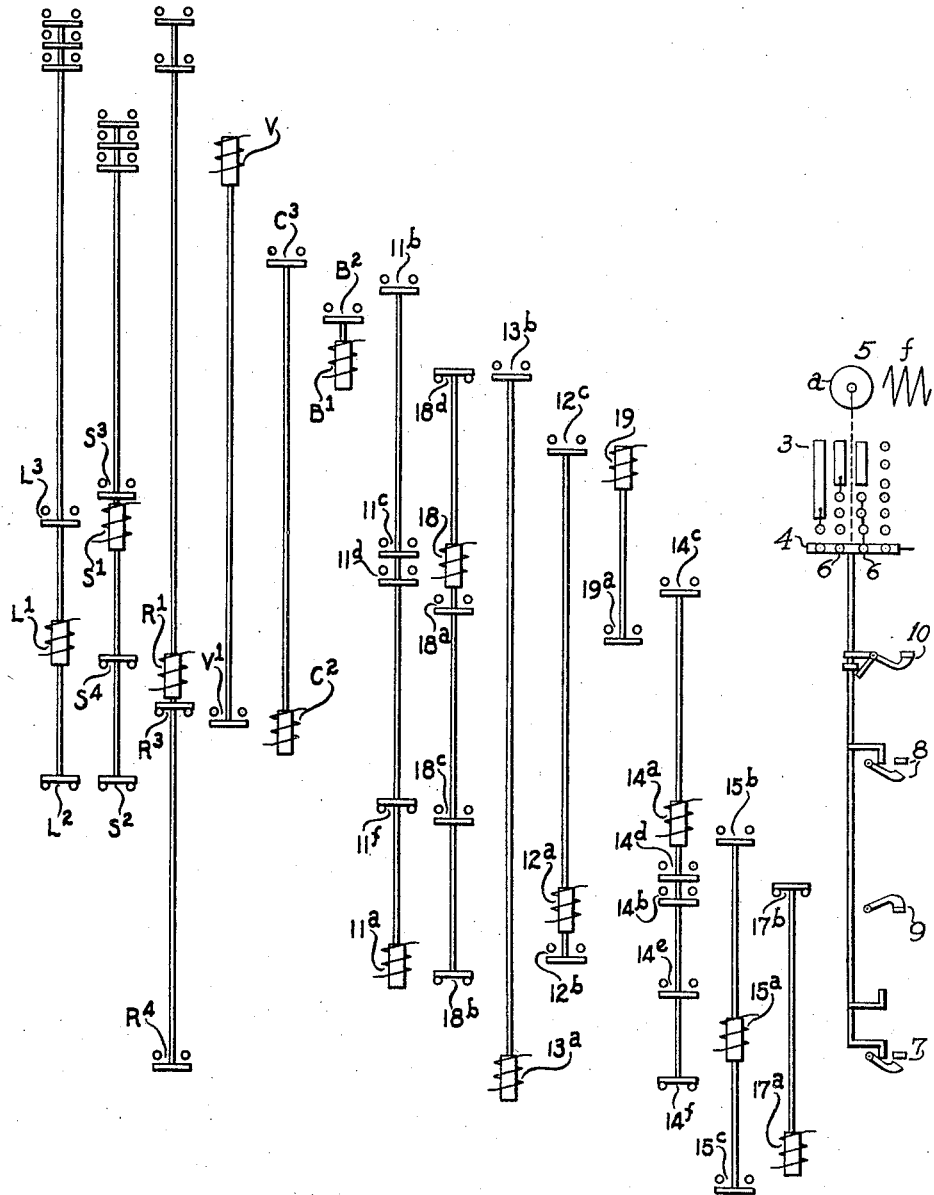

June 26, 1945.　　　C. P. FELDHAUSEN　　　2,379,072
CONTROLLER FOR MULTIMOTOR DRIVES
Filed April 24, 1942　　　3 Sheets-Sheet 3
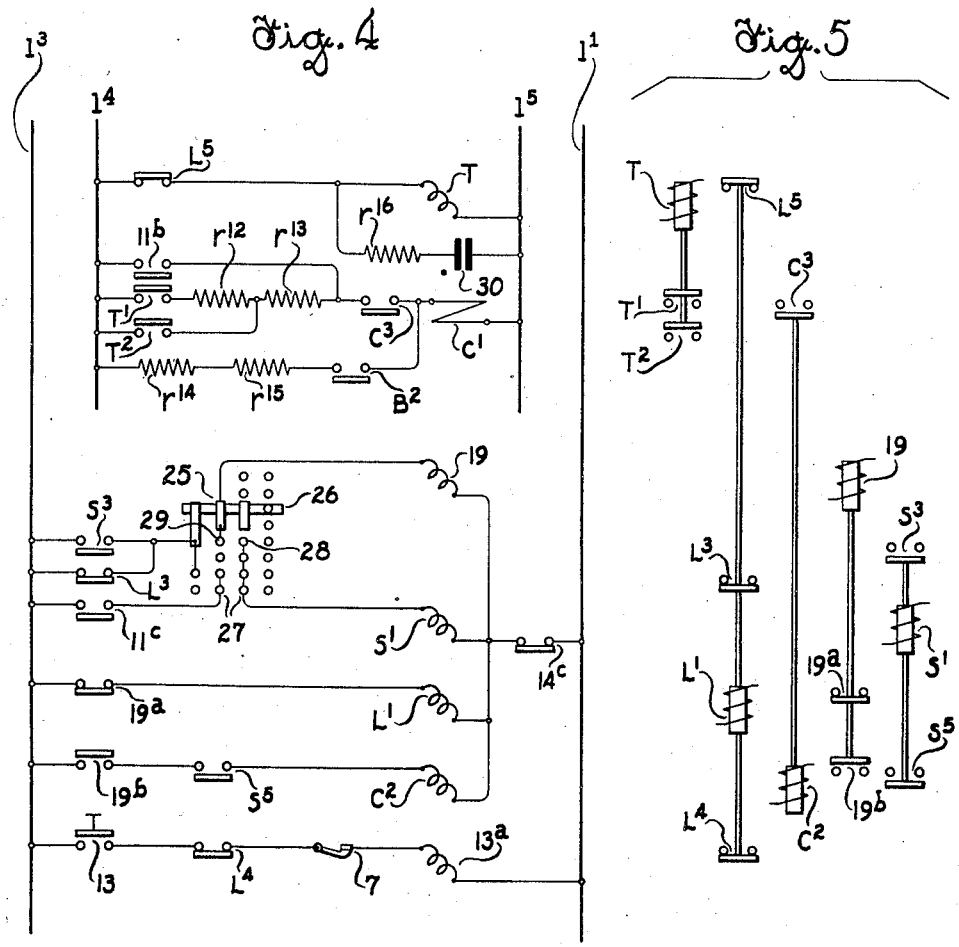

Patented June 26, 1945

2,379,072

UNITED STATES PATENT OFFICE 2,379,072

CONTROLLER FOR MULTIMOTOR DRIVES

Cyril P. Feldhausen, Wauwatosa, Wis., assignor to Cutler-Hammer, Inc., Milwaukee, Wis., a corporation of Delaware Application April 24, 1942, Serial No. 440,328

18 Claims. (Cl. 172—237)

This invention relates to improvements in drives for printing presses and other machines, and more particularly to drives of the multi-motor type.

In my prior Patent No. 2,252,762, granted August 19, 1941 there are disclosed a number of different types of two-motor drives comprising a relatively small motor for starting and for slow speed operation, and a relatively large motor for running, the two motors driving the driven machine through the large motor shaft and there being interposed between the two motors an electromagnetic clutch controllable to transfer the drive from either motor to the other, and the present invention is especially advantageous for drives of this type.

An object of the present invention is to provide control for such and other types of multi-motor drives utilizing an electromagnetic clutch to transfer the load from one motor to the other which will effect transfer of drive more smoothly than has heretofore been made possible with certainty.

A further object is to provide for smooth transfer through employment of simple and reliable means.

A further object is to afford a choice of means whereby the two motors may be brought to substantially the same speeds for transfer, and whereby the transfer will then be made quickly and with reliability.

Various other objects and advantages of the invention will hereinafter appear.

The accompanying drawings illustrate certain embodiments of the invention which will now be described, it being understood that the invention is susceptible of various additional modifications without departing from the scope of the appended claims.

In the drawings,

Fig. 3 is a chart showing in vertical alinement the coils and contacts of the various electromagnetic switches and relays shown in Fig. 2;

Fig. 4 is a line diagram showing a modification of the control of Fig. 2, and

Fig. 5 is a chart showing in vertical alinement the coils and contacts of electromagnetic switches and relays of Fig. 4.

Figure 1:
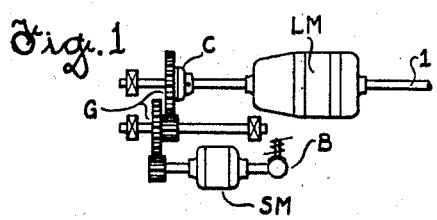
Figure 1 shows schematically and merely for reference purposes a two-motor drive of one form shown in my prior patent aforementioned.

Referring to Fig. 1, the same shows a relatively large motor LM having a shaft $l$ to be coupled to the driven machine, and a relatively small motor SM connected through gearing G, and an electromagnetic clutch C to the shaft $l$ of motor LM. The electromagnetic clutch will be assumed to be of the type which is engaged only upon energization thereof whereby upon its deenergization the motor SM is disconnected from the shaft of motor LM. The small motor SM is shown as provided with an electromagnetic brake B which sets in braking position when deenergized.

Figure 2:
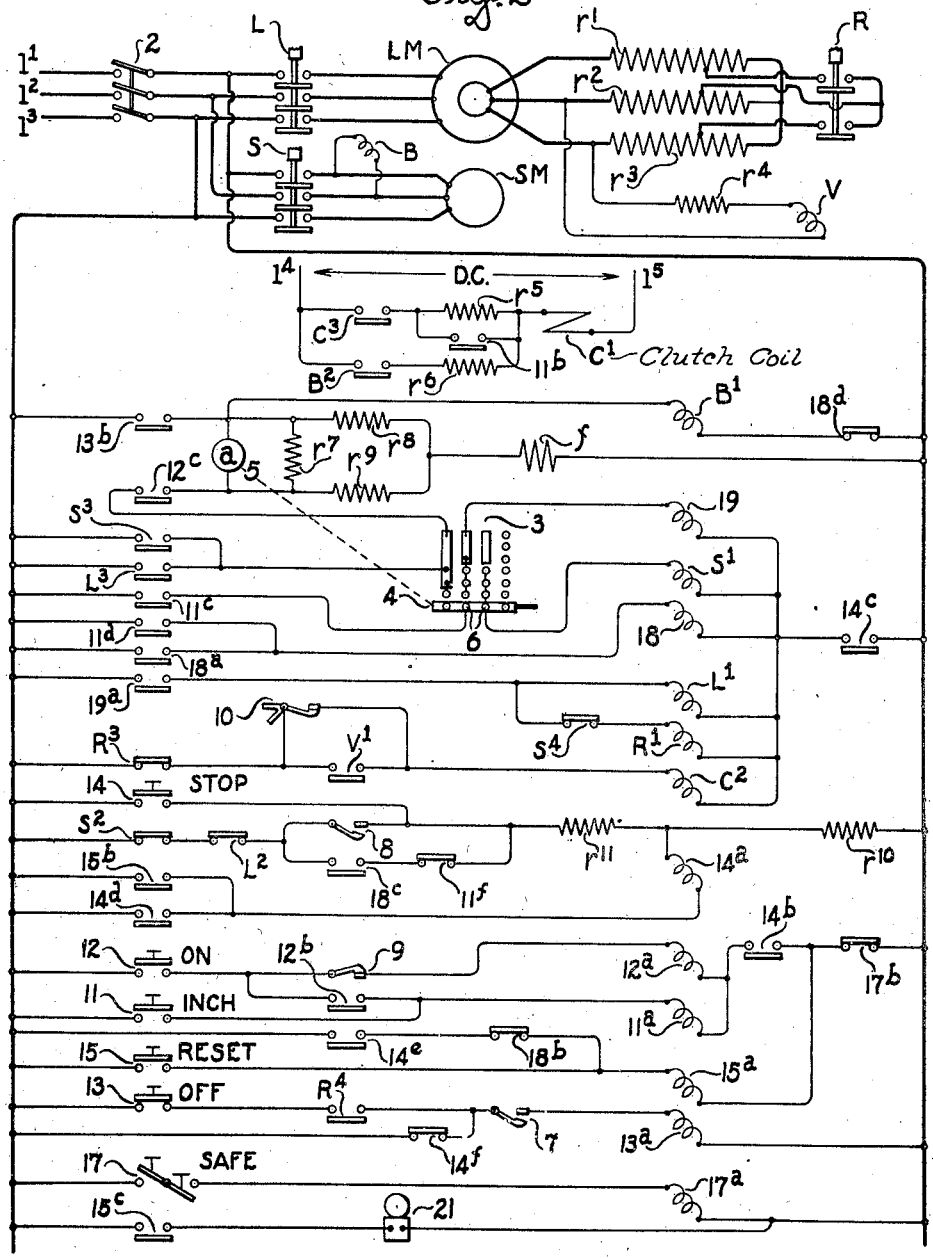
Fig. 2 is a line diagram of one form of control applicable to such drive.

Referring to Fig. 2, the same shows motors LM and SM as being of the three-phase induction type to be supplied with power from lines $l^1$, $l^2$ and $l^3$ through a suitable knife switch 2 and electromagnetic switches L and S, respectively. The motor SM is shown as having its brake coil B connected between two of its supply leads whereby said coil is energized upon closure of switch S. The large motor LM has resistors $r^1$, $r^2$ and $r^3$ for its secondary circuit, such resistors being star connected and each having a step to be short circuited by an electromagnetic switch R. The operating windings for the switches L, S, R are shown in the lower portion of Fig. 2, being designated $L^1$, $S^1$ and $R^1$, respectively. The secondary circuit of motor LM also has connected therein a winding V having one terminal connected between the secondary and the resistor $r^2$ and having its other terminal connected between the secondary and resistor $r^3$, the circuit of said winding including a resistor $r^4$. The winding V is provided for operation of a voltage relay which is designed for a given action thereof upon deceleration of the motor to a predetermined speed.

Shown below motor SM is a coil $C^1$ for the aforementioned electromagnetic clutch, this coil being supplied from a suitable D. C. supply circuit $l^4$, $l^5$. Coil $C^1$ is shown as permanently connected to line $l^5$, whereas it has commutable connections with line $l^4$, certain of such connections including a resistor $r^5$ and other of said connections including a resistor $r^6$. Certain of these connections are controlled by a so-called clutch relay having a winding $C^2$ shown in the lower portion of Fig. 2 and normally open contacts $C^3$ which when engaged connect clutch coil $C^1$ to line $L^4$ through resistor $r^5$. A so-called brake relay having a winding $B^1$ shown just below the clutch circuits has normally open contacts $B^2$ which when engaged connect the clutch coil $C^1$ to line $L^4$ through resistor $r^6$. A third relay constituting the inching relay of the control has a winding $11^a$ shown in the lower portion of Fig. 2 and has normally disengaged contacts $11^b$ located in a shunt around resistor $r^5$ of the clutch coil circuit.

The control of the motors and the clutch to be effected by the aforementioned and hereinafter described control means may be described in a general way as follows:

When the controller is operated for inching the small motor SM is energized with the clutch coil connected across D. C. lines L⁴, L⁵ through contacts C³ and 11ᵇ of the then energized clutch relay and inching relay, respectively. The clutch resistor r⁵ is thus short-circuited by contacts 11ᵇ for maximum clutch torque. When the controller is operated for running it first energizes the small motor SM, establishing the clutch connections aforementioned after which it establishes starting connections for the large motor LM, meanwhile deenergizing the inching relay to introduce the clutch resistor r⁵ for correct running torque of the clutch so long as the machine is operated at slow speed. In starting of the large motor all of its secondary resistance is included for restricting the torque of said motor, as for example to about 10% full load torque, which of course is small as compared with that of the clutch, and insufficient for drive of the load by the large motor. Then the controller may be operated to energize switch R to short-circuit a portion of the secondary resistance of the large motor to increase the torque of the large motor for a suitable increase in speed, as for example 25% speed. This provides for transfer of the drive from the small motor to the large motor and the clutch relay is deenergized upon energization of the switch R, thereby deenergizing the clutch to disconnect the small motor. If now the controller is operated to transfer the drive back to the small motor it first energizes the small motor SM and deenergizes the switch R, the clutch at this time remaining deenergized. This through opening of switch R to insert secondary resistance in the circuit of the large motor so reduces the torque of the large motor that said motor becomes ineffective to drive the press or other machine even without opening of the primary circuit of said motor, and as a consequence the machine and motor slow down until the speed thereof closely approximates the speed of the small motor SM whereupon the V relay if properly designed and adjusted responds to effect energization of the clutch relay for reenergization of the clutch coil C¹. The clutch coil when so energized has in circuit therewith the resistor r⁵ and thus through the slow down prior to energization of the clutch as previously set forth, a very smooth transfer of drive is brought about. Also the clutch is utilized in braking when the controller is operated for stopping and it is for such use of the clutch that the second circuit for its coil is provided. As will be understood, stopping operation of the controller disconnects both motors from circuit and deenergizes the brake B of the small motor, thus enabling the small motor to be used to brake the large motor and the driven machine through the clutch if energized. Under these conditions the clutch coil circuit is completed by relay B¹ through its contacts B², the connections including resistor r⁶ which is suitably designed for the correct torque of the clutch. The relay B¹ is energized by the controller as an incident to stopping and the controller upon completing its stopping cycle deenergizes the relay B¹.

Considering the additional control elements of Fig. 2, they comprise a generally conventional form of crosshead type controller 3 having its crosshead 4 driven by a pilot motor 5 having an armature a and a series field winding f. The pilot motor has in its circuit between the armature a and the field winding f resistors r⁷, r⁸ and r⁹ arranged in such well known manner that current flows through the field winding f in the same direction upon reversals of the flow of current in the armature a to reverse the direction of drive of the crosshead 4 of the controller 3. The crosshead 4 of the controller is shown in off position to bridge contact buttons 6 and is movable to interrupt the bridge of said buttons and to engage other buttons and contacts for desired control of the small motor and large motor and for other control, if desired. Also as indicated in Fig. 3, the crosshead in off position is employed to open a so-called off limit switch 7 and a so-called stop limit switch 8, and at its other extreme of movement to open a so-called on limit switch 9, each of said switches returning to closed position as the crosshead moves away from the corresponding limit. Also the crosshead is used to operate in a given position a switch 10 of the flipper type, opening said switch upon movement of the crosshead in one direction through such given position, and closing the switch upon movement of the crosshead through such position in the opposite direction. More particularly, switch 10 is closed with crosshead in the off position shown in Fig. 2.

Also the controller comprises an inch push button switch 11 controlling the winding 11ᵃ of the aforementioned inching relay, an on push button switch 12 controlling the operating winding 12ᵃ of a so-called on relay, an off push button switch 13 for controlling the operating winding 13ᵃ of a so-called off relay, a stop button 14 for controlling the operating winding 14ᵃ of a so-called stop relay, a reset push button switch 15 to control the operating winding 15ᵃ of a so-called reset relay, and a safe push button switch 17 controlling the operating winding 17ᵃ of a so-called safe relay. Additional relays shown comprise a so-called safe-after-inch relay having a winding 18, and for a purpose later set forth a relay having a winding 19.

While in Fig. 2 the contacts of the various electromagnetic switches and relays are scattered they are coordinated in the chart, Fig. 3, and moreover are correlated in Fig. 2 by reference characters used in the following description of circuits.

More specifically describing the control afforded by the controller shown in Fig. 2, no operation is possible until the safe push button switch 17 is opened as shown for deenergization of safe relay winding 17ᵃ to permit engagement of its contacts 17ᵇ common to the circuits controlled by the inch, on and reset push button switches. Also the stop relay must be energized, this being accomplished by pressing the reset push button switch 15. This connects relay winding 15ᵃ across the line through safe relay contacts 17ᵇ for energization of said winding to close contacts 15ᵇ in circuit with the stop relay winding 14ᵃ. Contacts 15ᵇ connect winding 14ᵃ across the line through resistor r¹⁰, and said winding responds to engage its contacts 14ᵇ common to the circuits controlled by the on and inch push button switches and also to close its contacts 14ᶜ common to the circuits of a number of windings including those of the small and large motor switches and of the clutch relay. The stop relay winding 14ᵃ when energized also engages contacts 14ᵈ to establish for itself a maintaining circuit shunting contacts 15ᵇ of the reset relay.

Also energization of the reset relay engages contacts $15^c$ in circuit with a bell 21 and the reset relay winding $15^a$ is maintained energized through a circuit completed through contacts $14^e$ of the stop relay and normally engaged contacts $18^b$ of another relay. The bell is thus caused to function as a signal and it continues to so function until the stop push button switch 14 is operated or until operation of a switch to effect starting of the driven machine. The stop relay contacts $14^c$ now being closed they together with contacts $R^3$ of resistance switch R and switch 10 of controller 3 complete an energizing circuit for the winding $C^2$ of the clutch relay, and said relay through its contacts $C^3$ completes circuit for the clutch coil $C^1$.

Inching may then be effected by depressing push button switch 11, this completing circuit from the left hand side of the line to and through the winding $11^a$ of the inch relay to the opposite side of the line, through the then engaged contacts $14^b$ and $17^b$ in series. Winding $11^a$ upon responding engages contacts $11^b$ to shunt the clutch resistor $r^5$ and also engages its contacts $11^c$ for energization of the winding $S^1$ of the small motor switch. More specifically circuit is completed from the left hand side of the line through contacts $11^c$ and the now bridged contacts 6 of the crosshead controller 3 to and through the winding $S^1$ to the opposite side of the line through now closed contacts $14^c$. Energization of the winding $S^1$ closes the switch S to start the motor SM for inching, said motor as has been indicated being connected to the driven machine through the clutch and the clutch coil circuit being such as to afford full clutch torque. Additionally the inching relay in responding engages its contacts $11^d$ to connect across the line through the now closed contacts $14^c$ the winding 18 of the safe-after-inch relay. Winding 18 when energized engages its contacts $18^a$ to establish for itself a maintaining circuit shunting the inching relay contacts $11^d$ and disengages its contacts $18^b$ to deenergize the winding $15^a$ of the reset relay, this permitting contacts $15^c$ to disengage to interrupt the signal bell circuit for termination of the bell signal. Inching operation continues until the push button switch 11 is released, this effecting deenergization of the inching relay, with consequent deenergization of the small motor switch S and also of the stop relay and the safe-after-inch relay whereby further inching is made dependent upon operation of both the reset push button and the inching push button. More specifically the stop relay is deenergized by shunting its winding $14^a$ through a resistor $r^{11}$ as the result of reengagement of normally engaged contacts $11^f$ of the inching relay, the shunt extending from contacts $11^f$ through then engaged contacts $18^c$ of the safe-after-inch relay to and through normally engaged contacts $L^2$ and $S^2$ of the motor switches L and S, respectively, to the left hand side of the line. The stop relay in dropping out permits opening of its contacts $14^c$, thereby deenergizing the winding 18 of the safe-after-inch relay which restores the controller to the condition thereof prevailing at the time of initiation of the inching operation aforedescribed.

Running is effected by first depressing the reset button 15 with the results aforedescribed and then depressing the on button 12. This closes circuit from the left hand side of the line through push button switch 12 and now closed limit switch 9, to and through winding $12^a$ of the on relay to the opposite side of the line through the then engaged contacts $14^b$ and $17^b$ in series. The on relay upon response of winding $12^a$ engages contacts $12^b$ in circuit with the winding $11^a$ of the inch relay paralleling it with the winding $12^a$ for response, with the results aforedescribed. Thus the small motor SM is started with the clutch coil $C^1$ energized for full clutch torque, as aforedescribed. Additionally response of the on relay winding $12^a$ engages contacts $12^c$ in the circuit of the pilot motor 5 of the crosshead controller. Meanwhile contacts $S^3$ of the now energized small motor switch S have closed, completing a circuit from the left hand side of the line to and through the left hand segment of controller 3, to and through the now closed contacts $12^c$ to the armature $a$ of motor 5, said motor having a permanent connection to the opposite side of the line through its field winding $f$. This circuit for the motor 5 provides for operation of said motor to raise the crosshead 4 and the crosshead when raised one step completes the circuit of relay winding 19. This circuit extends from the left hand side of the line through contacts $S^3$ to the left hand segment of controller 3, and thence through buttons bridged by the crosshead 4 to the next adjacent segment of the controller, to and through winding 19 to the opposite side of the line through now closed contacts $14^c$. Winding 19 is thus energized and upon responding engages contacts $19^a$ in circuit with the winding $L^1$ of the large motor switch L. Contacts $19^a$ complete circuit from the left hand side of the line to and through winding $L^1$ to the opposite side of the line through now closed contacts $14^c$. Thus the large motor switch L is rendered responsive to complete the primary circuit of the large motor LM, but at this time the resistance switch R is open for low torque of the large motor. When the large motor switch responds its contacts $L^3$ engage to establish a line connection for the left hand segment of the controller 3, shunting the contacts $S^3$ whereby the small motor switch may be deenergized without effect on the circuits controlled by the controller 3. If when the crosshead 4 has been moved upwardly one step the on button is released both motor switches L and S will remain energized for slow speed running. However, the on relay winding $12^a$ will be deenergized, releasing contacts $12^c$ to stop the pilot motor 5 and releasing contacts $12^b$ to deenergize the inching relay winding $11^a$, causing it to release its contacts $11^b$ to re-insert in circuit the clutch resistor $r^5$. This will afford the desired reduced clutch torque for running. Whereas under inching conditions deenergization of the inch relay winding $11^a$ deenergizes the stop relay and indirectly the safe-after-inch relay such effects are prevented whenever either the motor switch L or the motor switch S is maintained energized. As previously described these motor switches have contacts $L^2$ and $S^2$ in the shunt for the stop relay winding $14^a$ through which shunt the inching relay contacts $11^f$ deenergize the stop relay, and this shunt is interrupted by disengagement of either or both of the two sets of contacts $S^2$ and $L^2$. To stop the drive when operating at low speed it is necessary to press the stop button 14 which alone shunts through resistor $r^{11}$ the stop relay winding $14^a$, deenergizing the stop relay. Deenergization of the stop relay permits the contacts $14^c$ to open, deenergizing both motor switch windings $S^1$ and $L^1$, and also deenergizing the relay winding 19, with the result that the controller is restored to the same condition as that which existed before commencement of the on cycle of operation, it being understood that deenergization of the stop relay also effects release of the safe-after-inch relay as described in connection with the inching cycle.

When the drive is operating at slow speed with the crosshead 4 raised one step, transfer of the load from the small motor to the large motor and acceleration of the large motor may be effected by again depressing the on button. This again energizes the on relay winding $12^a$ and through consequent engagement of the contacts $12^b$ again energizes the inch relay winding $11^a$ to reclose contacts $11^b$, thereby commutating the clutch connections for full clutch torque. Also winding $12^a$ recloses contacts $12^c$ to again energize the pilot motor for continued elevation of the crosshead. When the crosshead passes off of the contact buttons connected to the winding $S^1$ said winding is deenergized to release switch S for disconnection from circuit of the small motor. At the same time switch S reengages its normally engaged contacts $S^4$ in circuit with the winding $R^1$ of resistance switch R. This connects winding $R^1$ in parallel to the winding $L^1$, thereby causing response of switch R to short-circuit secondary resistance of the large motor for increased torque and increased speed of the large motor. At the same time resistance switch R disengages its contacts $R^3$ in circuit with the clutch relay winding $C^2$ to deenergize said relay, thereby disconnecting from circuit clutch coil $C^1$, and thus completing transfer of the load to the large motor. Thereafter the large motor may be accelerated by further elevation of the crosshead 4 in a well known manner, the accelerating means having been omitted from the drawings for simplification. If the on button is held depressed until the crosshead reaches its upper limit the limit switch 9 associated with controller 3 operates to open the circuit of the on relay winding $12^a$, thereby nullifying the effect of retention of the on button in closed position. With the large motor operating at any speed stopping may be effected by pressing the stop button, with the results heretofore described in connection with stopping when operating at slow speed.

Transfer of the drive from the large motor to the small motor may be effected by depressing the off button 13 to energize the off relay winding $13^a$. The circuit of winding $13^a$ includes the limit switch 7 associated with the crosshead controller 3 and contacts $R^4$ of the resistance switch R, and as shown the circuit of winding $13^a$ is interrupted thereby. However, when the large motor alone is driving the contacts $R^4$ are engaged and the limit switch 7 is closed, wherefore the winding $13^a$ responds upon depression of push button switch 13 and in responding it engages contacts $13^b$ to connect the pilot motor 5 of the crosshead controller to the left hand line for operation of the crosshead downwardly. When the crosshead moves downwardly into engagement with the buttons of controller 3 connected to winding $S^1$ said winding responds to close the small motor switch S, at the same time opening its contacts $S^4$ to deenergize the winding $R^1$ of switch R for release of said switch to reinsert resistance in the secondary circuit of the large motor for the aforedescribed torque reduction of said large motor. At this time the clutch relay winding $C^2$ has its energizing circuit interrupted despite reengagement of the resistance switch contacts $R^3$ because at this time the contacts $V^1$ of the voltage relay are open and the flipper switch 10 associated with the crosshead controller is also open. Also at this time contacts $R^4$ are again disengaged to deenergize off relay winding $13^a$, with consequent disengagement of contacts $13^b$ to stop the pilot motor 5. However, when the large motor has slowed down to a predetermined speed the voltage relay winding V responds to close contacts $V^1$ for energization of the clutch relay winding $C^2$, with consequent energization of said relay and of the clutch coil $C^1$ controlled thereby. As previously indicated, should the off button be held depressed after the crosshead reaches the transfer position the cross head nevertheless stops in such position and maintains the large motor switch energized. The large motor switch is deenergized only upon stopping operation of the controller.

Stopping may be effected as previously set forth, and when effected with the crosshead controller in a running position, and hence with limit switch 7 closed, release of the stop relay with consequent reengagement of its contacts $14^t$ in the circuit of off relay winding $13^a$ effects energization of said relay. The contacts $13^b$ of said relay then complete the circuit of relay winding $B^1$, the contacts $18^d$ of the safe-after-inch relay now being closed and response of winding $B^1$, with consequent engagement of contacts $B^2$, completes the circuit of the clutch coil $C^1$ through resistor $r^6$, for utilization of the mechanically braked small motor to brake the large motor and the load, as earlier set forth. Energization of the off relay winding $13^a$ as just described also effects off operation of the pilot motor 5, continuing such operation until the crosshead reaches full off position and opens limit switch 7 to deenergize winding $13^a$.

Not only does the controller described provide for smoother transfer of drive from the large motor to the small motor, but it does so in the most reliable manner, namely as a function of decrease in speed of the large motor. The speed measuring means disclosed, namely relay V, is simpler than and hence preferable to means such as a fly ball governor switch or a tachometer type speed measuring means, but it will, of course, be understood that any preferred speed measuring means may be employed in lieu of the relay shown. Also the control described is advantageous in enabling transfer of drive from the large motor to the small motor without operation of the large motor switch L to break the primary circuit of said motor, thus prolonging the life of such switch. Other advantages, as for example, saving in number of mechanical interlocks required also have been found in practice.

Referring now to Fig. 4, the same shows a modification of the means aforedescribed which may be applied more readily to existing installations and which effects a smooth transfer of drive from the large motor to the small motor, the transfer being subject to a time element affording the large motor and the driven machine time to slow down to the speed of the small motor. The controller shown in Fig. 4 does not use the relay V or the resistance switch R of Fig. 2, but does use the large motor switch L represented by winding $L^1$ and the small motor switch S represented by winding $S^1$.

For simplification the showing of Fig. 4 has been restricted to the elements required for transfer of drive from the large motor to the small motor, the crosshead controller 25 which differs somewhat in detail from controller 3 of Fig. 2, being shown in running position to avoid need of repeating the showing of the associated means for effecting inching, running and stopping. The elements of Fig. 2 which are shown in addition to those heretofore mentioned comprise the clutch coil $C^1$, the clutch relay winding $C^2$, the clutch relay contacts $C^3$ to connect the clutch coil $C^1$ directly across lines $l^4$, $l^5$ through inching relay contacts $11^b$; inching relay contacts $11^c$ to connect the small motor switch winding across the line through the crosshead 26 and contacts 27 of controller 25, and through stop relay contacts $14^c$; off relay winding $13^a$ and off push button switch 13 to connect winding $13^a$ across the line through contacts $L^4$ of the large motor switch and through limit switch 7 to be opened by the crosshead 26 when in off position; and relay winding 19 to be energized to close contacts $19^a$ in circuit with winding $L^1$ and to open contacts $19^b$ in circuit with the clutch relay winding $C^2$, the latter circuit including also contacts $S^5$ of the small motor switch. The relay contacts here referred to are shown in the positions which they occupy during running.

The clutch coil $C^1$ has a connection between contacts $C^3$ and line $L^4$ including resistors $r^{12}$ and $r^{13}$ and contacts $T^1$ of a transfer relay having an operating winding T, while contacts $T^2$ of the same relay control a shunt for resistance $r^{12}$. These transfer relay contacts are normally engaged and are disengaged by the winding T when energized, the circuit for this winding being completed by contacts $L^5$ of the large motor switch when energized. Additionally the clutch coil $C^1$, as in Fig. 2, has another circuit controlled by relay contacts $B^2$, this circuit in this instance including resistors $r^{14}$ and $r^{15}$. Inasmuch as the controller is assumed to be in running position the transfer relay energizing circuit is shown as closed and its contacts are shown as being open. In a loop with the winding T of the transfer relay is a condenser 30 and a resistor $r^{16}$, the condenser receiving a charge of current due to engagement of contacts $L^5$.

The differences between the crosshead controller 25 and the controller of Fig. 2 will appear from the following explanation of operation and functioning of the means shown in Fig. 4, which as heretofore set forth are shown in running relation, the large motor switch being energized for operation of the large motor and the clutch coil being disconnected from circuit.

Under such conditions transfer of drive from the large motor to the small motor is effected by depressing the off button 13 to energize the off relay winding $13^a$ with the result of effecting downward movement of the crosshead 26, as by the means and in the manner explained in connection with Fig. 2. When crosshead 26 bridges the left hand segment of the controller and the uppermost contact button 28 it connects across the line through contacts $L^3$ and $14^c$ the winding $S^1$ which thereupon responds to close the small motor switch for starting of the small motor. Then as the crosshead 26 moves down another step and disengages button 29 it opens the circuit of relay 19 which permits contacts $19^a$ to open for deenergization of the large motor switch winding $L^1$ and hence for disconnection of the large motor from circuit. Also deenergization of winding $L^1$ permits opening of contacts $L^4$ to deenergize off relay winding $13^a$, thereby arresting off operation of the crosshead 26. Additionally deenergization of the relay winding 19 permits closure of contacts $19^b$ to complete the circuit of the clutch relay winding $C^2$, the contacts $S^5$ now being closed because of energization of winding $S^1$, as previously explained. The clutch thereupon responds to close its contacts $C^3$ in the circuit of the clutch coil, but at this time the contacts $11^b$, $T^1$, $T^2$ and $B^2$ are open to render the clutch circuit incomplete. The contacts $T^1$ and $T^2$ tend to reengage and their restraining winding T was disconnected from the line by contacts $L^5$ of the large motor switch when the large motor switch responded, as previously set forth, but the discharge of the condenser delays the decay of the magnetic flux of said winding, and hence delays reengagement of contacts $T^1$ and $T^2$ which are adjusted to reengage progressively at different values of the decaying flux, this type of switch being well known. Thus the press and large motor are afforded a time interval for slow down during which interval the small motor operates, but without driving connections. However, when contacts $T^1$ engage after lapse of a given time it completes circuit for clutch coil $C^1$ through resistors $r^{12}$ and $r^{13}$ for establishment of the small motor driving connections, but with restricted clutch torque. Then when the contacts $T^2$ engage after a further lapse of time said contacts shunt clutch resistor $r^{12}$ for increased clutch torque. Thus when the motors are initially coupled the clutch is in condition to slip if the large motor has not slowed down to the speed of the small motor, whereas after a predetermined slipping period the clutch torque is increased to the desired value for running at slow speed.

What I claim as new and desire to secure by Letters Patent is:

1. For printing presses and other machines, in combination, a drive comprising a motor for starting and for slow speed operation and a motor for higher speed operation, control means including an electromagnetic clutch to effect transfer of drive from the latter motor to the former motor involving engagement of said clutch, and automatic means operating as a function of slowdown of said latter motor to delay such engagement of said clutch to afford a slowdown period incident to such transfer.

2. For printing presses and other machines, in combination, a drive comprising a motor for starting and for slow speed operation and a motor for higher speed operation, control means including an electromagnetic clutch to effect transfer of drive from the latter motor to the former motor involving engagement of said clutch, and also including means operating as an incident to transfer for so reducing the torque of said latter motor as to permit of such transfer with said latter motor energized, and automatic means operating as a function of deceleration of said latter motor to afford a slowdown period incident to such transfer and subsequent to such reduction of torque of said latter motor.

3. For printing presses and other machines, in combination, a drive comprising a motor for starting and for slow speed operation and an induction motor for higher speed operation, control means including an electromagnetic clutch to effect transfer of drive from the latter motor to the former motor involving engagement of said clutch, and a relay having its winding connected in the secondary circuit of said latter motor for operation as a function of slowdown of said latter motor, said relay delaying engagement of said clutch thereby to afford a slowdown period incident to such transfer.

4. For printing presses and other machines, in combination, a drive comprising a motor for starting and for slow speed operation and an induction motor for higher speed operation, control means including an electromagnetic clutch to effect transfer of drive from said induction motor to the first mentioned motor involving engagement of said clutch, and also including means operable as an incident to transfer to increase the resistance of the secondary circuit of said induction motor thereby to so reduce the torque of said induction motor as to permit of its continued energization in transferring the drive, and a relay having its winding connected in the secondary circuit of said induction motor and operating as a function of deceleration of said induction motor, said relay delaying engagement of said clutch thereby to afford a slowdown period incident to such transfer and subsequent to the aforementioned torque reduction of said induction motor.

5. For printing presses and other machines, in combination, a drive comprising a motor for starting and for slow speed operation and a motor for higher speed operation, control means including an electromagnetic clutch to effect transfer of drive from the latter motor to the former motor involving engagement of said clutch, and means to delay such engagement of said clutch, said delaying means comprising inductive time element means functioning as an incident to transfer.

6. For printing presses and other machines, in combination, a drive comprising a motor for starting and for slow speed operation and a motor for higher speed operation, control means including an electromagnetic clutch to effect transfer of drive from the latter motor to the former motor involving engagement of said clutch, and means operating as an incident to transfer of drive but subject to predetermined delay first to energize said clutch for limited clutch torque and then to effect increased clutch torque.

7. For printing presses and other machines, in combination, a drive comprising a relatively small motor and a larger motor, control means including an electromagnetic clutch, providing for starting by energization of said small motor and said clutch with full clutch torque and for optional continued drive by said small motor with the clutch torque reduced, said control means also providing for energization of both motors and transfer of drive from either to the other while both are energized, and automatic means operating as an incident to transfer of drive to disengage or reengage said clutch in accordance with the transfer to be effected.

8. For printing presses and other machines, in combination, a drive comprising a relatively small motor and a larger motor, control means including an electromagnetic clutch, providing for starting by energization of said small motor and said clutch with full clutch torque and for optional continued drive by said small motor with the clutch torque reduced, said control means also providing for energization of both motors, for transfer of drive from either to the other while both are energized, and for reduction of the torque of the larger motor to a value suitable for transfer, and automatic means operating as an incident to transfer of drive to disengage or reengage said clutch in accordance with the transfer to be effected and to provide a slowdown period incident to clutch operation in transferring the drive from said larger motor to said small motor.

9. The method of transferring drive from a relatively large motor to a smaller motor when both motors are energized with the smaller motor running free which consists in rendering the larger motor ineffective to drive the load, thereby bringing about deceleration of the large motor and thereafter while both motors are energized coupling the two motors together but subject to delay for substantial deceleration of the large motor.

10. The method of transferring drive from a relatively large motor to a smaller motor when both are energized but with the smaller motor running free, which consists in maintaining during transfer the power connections of the large motor but reducing the torque of the large motor to a value such that the large motor is disabled for driving its load, then allowing the large motor to slow down to a speed substantially like that of the smaller motor and then coupling the motors together.

11. The method of providing for drive of a load by a relatively small motor for slow speed and by a larger motor for higher speeds and of further providing for transfer of drive from either motor to the other, the motors having a releasable coupling, consisting in energizing the small motor alone for starting and for slow speed operation, then energizing the larger motor with restriction of its torque to a value disabling the larger motor for drive of the load, then increasing the torque of the larger motor and uncoupling the small motor and thereafter similarly restricting the torque of the larger motor for subsequent transfers of drive while maintaining power connections for the larger motor pending termination of drive.

12. The method of providing for drive of a load by a relatively small motor for slow speed and by a larger motor for higher speeds and of further providing for transfer of drive from either motor to the other, the motors having a releasable coupling, consisting in energizing the small motor alone for starting and for slow speed operation, then energizing the larger motor with restriction of its torque to a value disabling the larger motor for drive of the load, then increasing the torque of the larger motor and uncoupling the small motor and thereafter similarly restricting the torque of the larger motor for subsequent transfers of drive while maintaining power connections for the larger motor pending termination of drive and utilizing the reduced torque condition of the larger motor to bring about deceleration to a speed substantially like that of the small motor prior to recoupling the motors.

13. For a printing press or other drive having a relatively small motor and a larger motor, in combination, an electromagnetic clutch to couple the motors together, control means for the motors and said clutch to afford starting, inching and slow speed operations at will by starting the small motor and rendering said clutch effective and to afford at will transfer of drive from the small motor to the larger motor, disengaging said clutch and stopping the small motor, and control means to afford at will reengagement of said clutch while said larger motor remains energized but only after restarting of the small motor and only after lapse of a period for slowdown of the larger motor following restarting of the small motor.

14. For a printing press or other drive having a relatively small motor and a larger motor, in combination, an electromagnetic clutch to couple the motors together, control means for the motors and said clutch to afford starting, inching and slow speed operations at will by starting the small motor and rendering said clutch effective and to afford at will transfer of drive from the small motor to the larger motor, disengaging said clutch and stopping the small motor, and control means to afford at will reengagement of said clutch for retransfer of drive while the larger motor operates but only after restarting of the small motor and only after lapse of a period for slowdown of the larger motor following restarting of the small motor, the aforementioned control means including means to maintain power connections for the larger motor during and after re-transfer of the drive to the small motor but affording for re-transfer of the drive and thereafter while the small motor is driving, reduction of the torque of the larger motor to a value rendering the larger motor alone incapable of driving the load.

15. For a printing press or other drive having a relatively small motor and a larger motor, in combination, an electromagnetic clutch to couple the motors together, control means for the motors and said clutch to afford starting, inching and slow speed operations at will by starting the small motor and rendering said clutch effective and to afford at will transfer of drive from the small motor to the larger motor, disengaging said clutch and stopping the small motor, and control means to afford at will reengagement of said clutch for re-transfer of drive while the larger motor operates but only after re-starting of the small motor and only after lapse of a period for slowdown of the larger motor following re-starting of the small motor, the aforementioned control means including means affording for re-transfer of the drive and thereafter while the small motor is driving reduction of the torque of the larger motor to a value rendering the larger motor alone incapable of driving the load, and said last mentioned means so reducing the torque of the larger motor at commencement of the slowdown period.

16. For a printing press or other drive having a relatively small motor and a larger motor, in combination, an electromagnetic clutch to couple the motors together, control means for the motors and said clutch to afford starting, inching and slow speed operations at will by starting the small motor and rendering said clutch effective and to afford at will transfer of drive to the larger motor, disengaging said clutch and stopping the small motor, and control means to afford re-engagement of said clutch while the larger motor operates, but only after restarting of the small motor and only as a function of reduction of the speed of the larger motor to substantially the same speed as that of the small motor.

17. For a printing press or other drive having a relatively small motor and a larger motor, in combination, an electromagnetic clutch to couple the motors together, control means for the motors and said clutch to afford starting, inching and slow speed operations at will by starting the small motor and rendering said clutch effective and to afford at will transfer of drive to the larger motor, disengaging said clutch and stopping the small motor, and control means to afford reengagement of said clutch while the larger motor operates, but only after restarting of the small motor and only as a function of reduction of the speed of the larger motor to substantially the same speed as that of the small motor, the aforementioned control means including means to maintain power connections for the larger motor during and after re-transfer of the drive but affording for re-transfer of the drive and thereafter while the small motor is driving, reduction of the torque of the larger motor to a value rendering the larger motor alone incapable of driving the load, so reducing the torque of the larger motor at an early stage in the re-transfer cycle of operation.

18. For drive of printing presses and other machines, in combination, a first motor for starting the driven machine and driving it at slow speed, a second motor for driving the driven machine at higher speed, an electromagnetic clutch through the medium of which the drive may be transferred from one motor to the other and requiring energization for transfer of drive from said second motor to said first motor, control means for said motors and said clutch, which control means if operated for transfer of drive to said first motor when said second motor is operating at high speed tends to slow down said second motor but tends to effect energization of said clutch in advance of the desired slow down, and other means automatically controlling said clutch to delay for a temporary slow down period energization of said clutch in response to said first mentioned means.

CYRIL P. FELDHAUSEN.